United States Patent
Barbier et al.

(10) Patent No.: US 10,859,446 B2
(45) Date of Patent: Dec. 8, 2020

(54) TEMPERATURE MEASURING DEVICE

(71) Applicants: CONTINENTAL AUTOMOTIVE FRANCE, Toulouse (FR); CONTINENTAL AUTOMOTIVE GMBH, Hannover (DE)

(72) Inventors: Pascal Barbier, Tournefeuille (FR); Jacques Rocher, Saint Orens de Gameville (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 121 days.

(21) Appl. No.: 15/736,015

(22) PCT Filed: Jun. 23, 2016

(86) PCT No.: PCT/EP2016/001077
§ 371 (c)(1),
(2) Date: Dec. 13, 2017

(87) PCT Pub. No.: WO2016/206810
PCT Pub. Date: Dec. 29, 2016

(65) Prior Publication Data
US 2018/0180490 A1  Jun. 28, 2018

(30) Foreign Application Priority Data
Jun. 26, 2015 (FR) ..................... 15 55970

(51) Int. Cl.
*G01K 13/00* (2006.01)
*G01K 7/25* (2006.01)
(Continued)

(52) U.S. Cl.
CPC ............... *G01K 7/25* (2013.01); *F01N 3/208* (2013.01); *F02D 41/20* (2013.01);
(Continued)

(58) Field of Classification Search
CPC .......... G01K 15/007; G01K 7/20; G01K 7/01; G01K 13/00; G01K 2217/00; G01K 7/021;
(Continued)

(56) References Cited

U.S. PATENT DOCUMENTS 3,544,869 A * 12/1970 McBride, Jr. .......... H02H 5/042
318/788
3,643,142 A * 2/1972 McBride, Jr. ........ H02H 7/0852
318/788
(Continued)

FOREIGN PATENT DOCUMENTS

| CN | 1149714 A | 5/1997 |
| CN | 1274965 A | 11/2000 |

(Continued)

OTHER PUBLICATIONS

International Search Report, dated Jul. 21, 2016, from corresponding PCT/EP2016/001077 application.

*Primary Examiner* — Gail Kaplan Verbitsky
(74) *Attorney, Agent, or Firm* — Nixon & Vanderhye

(57) ABSTRACT

Temperature measuring device for measuring the temperature of a member, the member including a component controlled by a control signal, active at most during at least one limited activity interval, and transmitted to the component via two wires, a temperature probe connected to the two wires, in parallel with the component, and a diode, connected between a terminal of the component and a terminal of the probe connected to the same wire, in order to allow the passage of a current in the component only in a first (Continued)

direction, the temperature measurement being performed by a current flowing in a second direction, opposite to the first direction, outside of the activity interval.

16 Claims, 1 Drawing Sheet

(51) Int. Cl.
```
G01K 7/22       (2006.01)
F02D 41/20      (2006.01)
F01N 3/20       (2006.01)
F02M 51/00      (2006.01)
F02M 57/00      (2006.01)
F01N 9/00       (2006.01)
```
(52) U.S. Cl.
CPC ........ *F02M 51/005* (2013.01); *F02M 57/005* (2013.01); *G01K 7/22* (2013.01); *F01N 3/2066* (2013.01); *F01N 9/00* (2013.01); *F01N 2610/1453* (2013.01); *F01N 2900/1811* (2013.01); *F01N 2900/1821* (2013.01); *F02D 2041/2027* (2013.01); *F02D 2041/2065* (2013.01); *F02D 2041/2072* (2013.01); *G01K 2205/00* (2013.01)

(58) Field of Classification Search
CPC .. G01K 7/24; G01K 7/00; G01K 7/16; G01K 2201/00; G01K 2215/00; G01K 2205/00; G01N 21/27; G01N 27/4065; G01N 27/419
USPC ....... 374/183, 185, 170, 178, 184, 163, 152, 374/144
See application file for complete search history.

(56) References Cited

U.S. PATENT DOCUMENTS

| | | | |
|---|---|---|---|
| 5,116,136 A * | 5/1992 | Newman | G01K 7/25 |
| | | | 327/512 |
| 5,317,520 A * | 5/1994 | Castle | G01K 7/20 |
| | | | 374/172 |
| 5,475,371 A * | 12/1995 | Dunk | H02H 3/042 |
| | | | 324/522 |
| 5,844,135 A | 12/1998 | Brammer et al. | |
| 6,313,808 B1 | 11/2001 | Yuanzhu | |
| 6,380,861 B2 * | 4/2002 | Estelle | B05C 5/001 |
| | | | 340/588 |
| 7,417,487 B2 * | 8/2008 | Mori | H01L 27/0248 |
| | | | 327/512 |
| 7,969,227 B2 * | 6/2011 | Hasegawa | G01K 7/01 |
| | | | 327/512 |
| 9,086,442 B2 * | 7/2015 | Mayer | G01R 31/025 |
| 9,222,844 B2 * | 12/2015 | Rud | G01K 7/20 |
| 9,250,138 B2 * | 2/2016 | Watanabe | G01K 1/026 |
| 9,442,170 B2 * | 9/2016 | Drouin | G01K 7/01 |
| 9,753,138 B1 * | 9/2017 | Snow | G01J 3/46 |
| 9,823,105 B2 * | 11/2017 | Lehmkuhl | G01K 7/20 |
| 9,829,387 B2 * | 11/2017 | Furtner | G01K 7/01 |
| 10,309,841 B2 * | 6/2019 | Takechi | G01K 7/25 |
| 10,317,292 B2 * | 6/2019 | Liaghati | G01K 7/20 |
| 10,356,522 B2 * | 7/2019 | Lawrence | |
| 10,605,175 B2 * | 3/2020 | Dalley | F02D 41/222 |
| 2012/0130594 A1 | 5/2012 | Murty et al. | |
| 2013/0144549 A1 * | 6/2013 | Temkine | G01K 7/01 |
| | | | 702/99 |
| 2014/0046619 A1 | 2/2014 | Heinrich | |
| 2016/0087420 A1 * | 3/2016 | Kanakubo | H02H 3/087 |
| | | | 361/18 |
| 2016/0227610 A1 | 8/2016 | Bolz et al. | |
| 2019/0273488 A1 * | 9/2019 | Reiter | H03K 17/08104 |

FOREIGN PATENT DOCUMENTS

| | | | |
|---|---|---|---|
| CN | 103415690 A | | 11/2013 |
| CN | 105493623 A | | 4/2016 |
| DE | 10 2013 217923 A1 | | 3/2015 |
| FR | 2 403 550 A1 | | 4/1979 |
| JP | 401107698 A | * | 1/1989 |
| JP | 06114003 A | * | 4/1994 |
| JP | H06-140682 A | | 5/1994 |

* cited by examiner

TEMPERATURE MEASURING DEVICE

BACKGROUND OF THE INVENTION

The present invention relates to a temperature measuring device.

Temperature often conditions the behavior of a member. Consequently, a measurement of the temperature of a member may be useful to a control unit of such a member, typically for adapting the control of the member.

Such a member includes at least one controlled component. This component is connected to the control unit by means of at least two wires in order to be able to receive a control signal from the control unit.

It is known, in order to provide a temperature measurement, to add a temperature measurement means close to the member or to integrate same into the member. Such a measurement means generally requires the addition of at least two wires in order to power the measurement means and to perform the temperature measurement. These wires and the associated connections are, detrimentally, added to the wires used for control.

The controlled component generally has a certain resistance, which most often varies according to the temperature. Consequently, it possible and known to perform an estimate of the temperature by observing the value of this resistance. This advantageously makes it possible to reuse the control circuit and does not require any addition of wires. However, the component is adapted to the function of the member and does not have, as a result, a good sensitivity to the resistance according to temperature. Consequently, this approach most often does not allow very accurate temperature measurement.

Thus, e.g. in a case of an application in which the member is an injector, the temperature at the injector tip or nozzle has an influence on the viscosity of the injected liquid, which modifies the injected liquid flow rate. Consequently, knowing the temperature is useful in that it makes it possible, according to the flow rate, to correct the duration of injection in order to inject a given mass of liquid.

If the member is an injector, the controlled component is a coil of this injector. This coil, mainly inductive, is optimized for setting in motion a needle selectively blocking a nozzle of the injector. In addition, the value of this resistance has an order of magnitude close to the values of the wiring and connection resistances and a resistance measurement is thus influenced by the wiring and connections. The observation of the resistance of the coil for determining the temperature of the injector, as a result of an accumulation of interference, leads to an accuracy of about +/−20° C., which is low in view of the intended application.

SUMMARY OF THE INVENTION

The invention provides an innovative temperature measuring device that does not have the drawbacks of the prior art, in that it allows the addition of a measurement means, allowing a clearly improved accuracy, without the need for an additional wire between the control unit and the member.

The invention relates to a temperature measuring device for measuring the temperature of a member, said member including a component controlled by means of a control signal, active at most during at least one limited activity interval, and transmitted to the component via two wires, a temperature measurement means connected to the two wires, in parallel with the component, and a diode, connected between a terminal of the component and a terminal of the measurement means connected to the same wire, in order to allow the passage of a current in the component only in a first direction, the temperature measurement being performed by means of a current flowing in a second direction, opposite to the first direction, outside of the activity interval.

According to another feature, the measurement means and the diode are arranged in the member.

According to another feature, the measurement means is a thermistor, and the resistance of the component is negligible compared to the resistance of the thermistor.

According to another feature, the thermistor has a variable resistance, preferably of the type with a negative temperature coefficient, NTC, or a positive temperature coefficient, PTC.

According to another feature, the member is an injector and the component is a coil.

According to another feature, the device further includes a control unit, connected to the two wires, on the side opposite the component, and comprising a switching means capable of selectively switching between a control mode in which the control signal is transmitted by means of the two wires for the attention of the component by means of a current flowing in the first direction, during the activity interval, and a measurement mode in which a measuring current flows in the two wires and the measurement means in the second direction, outside of the activity interval.

According to another feature, the device further includes a corrective module, capable of correcting a temperature measurement according to a thermal model.

The invention further relates to a member including a part of such a measuring device.

The invention further relates to such a member and such a measuring device.

BRIEF DESCRIPTION OF THE DRAWINGS

Other features, details and advantages of the invention will emerge more clearly from the detailed description given below as a guide in relation to the drawings in which.

DETAILED DESCRIPTION OF THE PREFERRED EMBODIMENTS

Figure 1:
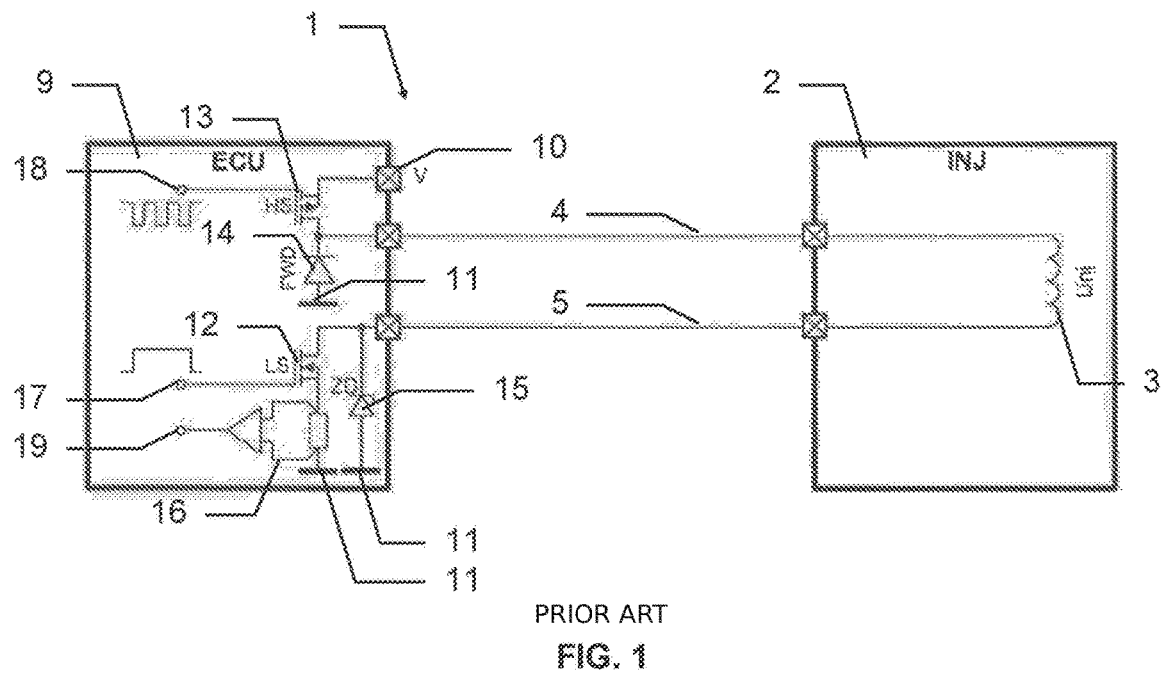
FIG. 1 depicts an assembly including a member and a control unit, according to one embodiment according to the prior art.

FIG. 1 illustrates a device 1 according to the prior art, including a member 2 and its control unit 9. The member 2 includes a component 3 the terminals of which are each connected to a wire 4, 5. These two wires 4, 5 are connected at the other end of same to the control unit 9.

The control unit 9 is capable of producing a control signal capable of controlling the component 3. The control of the component 3 by the control unit 9 is characterized in that it uses two wires 4, 5 and in that it is not continuously active. Thus the control signal transmitted by the control unit 9 to the member 2 is only active a part of the time, known as the activity time and which includes at least one activity interval. Each of said activity intervals is limited in that it is not continuous. Thus said activity intervals free up at least one interval free of a control signal.

A control signal may be any not necessarily continuous signal. It may be a coded digital type of control signal, the two wires being used as a bus or a serial link. In the case of an application to an injector the control signal includes pulse trains. Each pulse train, which corresponds to an injection sequence, uses a modulated current according to a Pulse Width Modulation (PWM). The signal is inactive at zero between two pulse trains. Thus an activity interval corresponds to a pulse train, while a duration between two pulse trains corresponds to a free interval.

The control unit 9 is capable of transmitting a control signal to the member 2. According to the illustrated embodiment, this is implemented via a switching means including a half bridge composed of a first switch 12, LS and a second switch 13, HS. The first switch 12, LS makes it possible to selectively connect the ground 11 with the second wire 5. This connection is controlled by the control unit 9, via the input point 17, a high signal level typically controlling a closure. The second switch 13, HS makes it possible to selectively connect a voltage source 10, V with the first wire 4. This connection is controlled, by the control unit 9, via the input point 18, a high signal level typically controlling a closure. If at least one of the switches 12, 13 is open no voltage is present. If both switches 12, 13 are simultaneously closed, a voltage V is present between the two wires 4, 5 and thus at the terminals of the component 3. If the component 3 so allows, a current is established through the component 3 and the two wires 4, 5. The two controls applied to the points 17, 18 together help to produce a control signal applied to the component 3.

Conventionally, in the case of an injector, an "enable" signal is applied to one of the switches 12, 13, here to the switch 12, via the point 17 and a "control" signal is applied to the other switch, here the switch 13, via the point 18. The enable signal controls a closure for the whole duration of use of the component 3, i.e. typically during a pulse train. The control signal controls a closure when an activation of the component 3 is desired. A voltage V is thus applied to the terminals of the component 3 according to a profile substantially reproducing the signal applied to the point 17.

The control unit 9 of the device 1 further includes a freewheeling diode 14, FWD connected from the ground 11 to a connection point between the first wire 4 and the second switch 13 and a Zener diode 15, ZD connected from the ground 11 to a connection point between the second wire 5 and the first switch 12.

The control unit 9 of the device 1 may further optionally include an assembly 16 including a resistor and an operational amplifier. The resistor is connected in series between the first switch 12 and the ground 11. Each of the two terminals of the resistor is connected to an input of the operational amplifier the output of which is connected to a measurement point 19. A measurement at the point 19 is thus indicative of a voltage drop at the terminals of the resistor and thus, since the value of the resistor is known with precision, it is possible to estimate the current flowing in the resistor and therefore in the wires 4, 5 and the component 3. A reading of this current measurement is used, e.g. in the case of an injector, for servo control.

Figure 2:
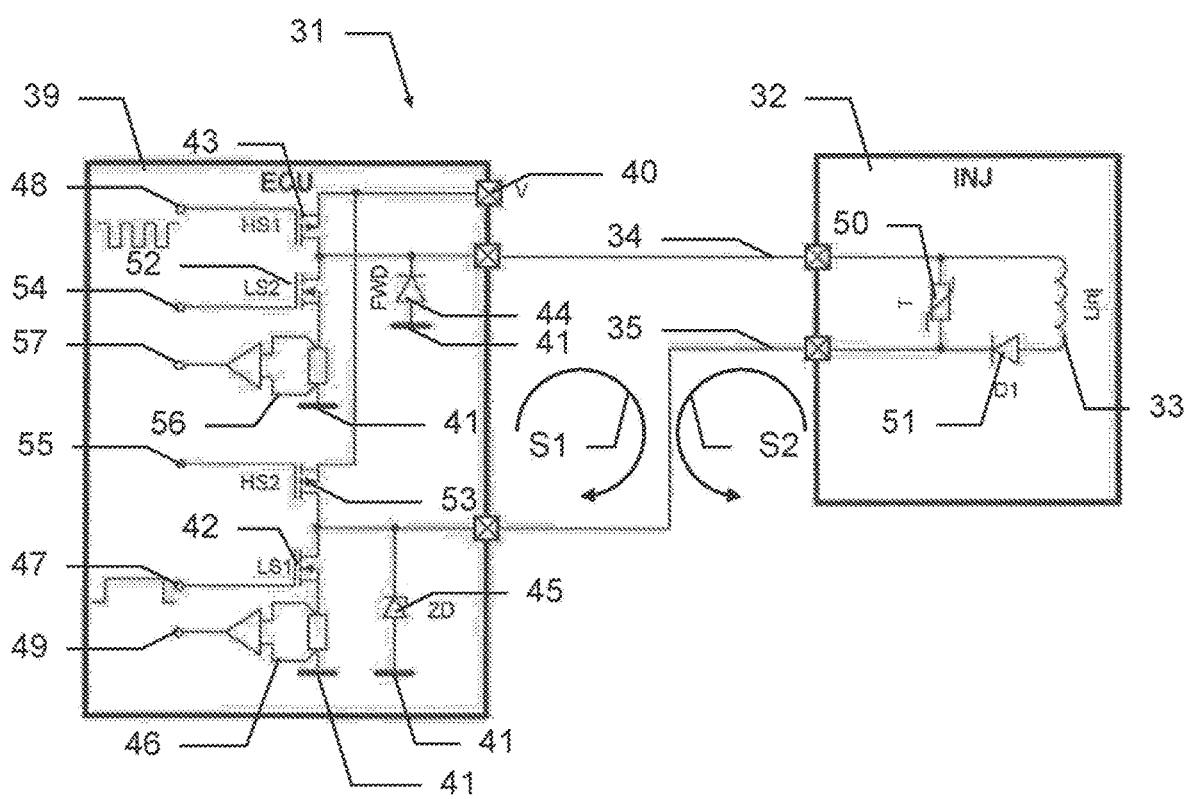
FIG. 2 depicts the same assembly, completed to include a temperature measuring device, according to one embodiment according to the invention.

FIG. 2 illustrates a device 31 according to the invention, including a member 32 and the control unit 39 thereof.

This second device 31 is substantially identical to the first device 1. The references 31-49 designate, with an offset of 30, the same elements as those designated by the respective references 1-19. These elements, respectively perform the same functions.

Thus the member 32 includes a component 33 the terminals of which are each connected to a wire 34, 35. These two wires 34, 35 are connected at the other end of same to the control unit 39. The control unit 39 is capable of producing a control signal capable of controlling the component 33. The control of the component 33 by the control unit 39 is characterized in that it uses two wires 34, 35 and in that it is not continuously active. Thus the control signal transmitted by the control unit 39 to the member 32 is only active a part of the time, known as the activity time and which includes at least one activity interval. Each of said activity intervals is limited in that it is not continuous. Thus said activity intervals free up at least one interval free of control signal.

Said at least one free interval, in which the wires 34, 35 are unused are advantageously made good use of for performing at least one temperature measurement by reusing said wires 34, 35.

The control unit 39 is capable of transmitting a control signal to the member 32. According to the illustrated embodiment, this is performed via a switching means including a first half bridge composed of a first switch 42, LS1 and a second switch 43, HS1. The first switch 42, LS1 makes it possible to selectively connect the ground 41 with the second wire 35. This connection is controlled, by the control unit, via the input point 47, a high signal level typically controlling a closure. The second switch 43, HS1 makes it possible to selectively connect a voltage source 40, V with the first wire 34. This connection is controlled, by the control unit, via the input point 48, a high signal level typically controlling a closure. If at least one of the switches 42, 43 is open no voltage is present. If both switches 42, 43 are simultaneously closed, a voltage V is present between the two wires 34, 35 and thus at the terminals of the component 33. If the component 33 so allows, a current is established through the component 33 and the two wires 34, 35, in a first direction S1 of the current. The two controls applied to the points 47, 48 together help to produce a control signal applied to the component 33.

Conventionally, in the case of an injector, an "enable" signal is applied to one of the switches 42, 43, here to the switch 42, via the point 47 and a "control" signal is applied to the other switch, here the switch 43, via the point 48. The enable signal controls a closure for the whole duration of use of the component 33, i.e. typically during a pulse train. The control signal controls a closure when an activation of the component 33 is desired. A voltage V is thus applied to the terminals of the component 33 according to a profile substantially reproducing the signal applied to the point 47.

The control unit 39 of the device 31 further includes a freewheeling diode 44, FWD connected from the ground 11 to a connection point between the first wire 34 and the second switch 43 and a Zener diode 45, ZD connected from the ground 41 to a connection point between the second wire 35 and the first switch 42.

The control unit 39 of the device 31 may further optionally include an assembly 36 in all points identical to the assembly 16 previously described for the device 1.

According to the invention, the device 31 further includes a temperature measurement means 50. This measurement means 50 is connected, in parallel with the component 33, between the two wires 34, 35. The device 31 further includes a diode 51, D1. This diode 51 is connected between a terminal of the component 33 and a terminal of the measurement means 50, these two terminals being connected to the same wire of the two wires 34, 35. This diode 51 is connected and directed so as to allow the passage of a current in the component 33 only in a first direction S1 of the current flow, flowing according to the illustration first in the first wire 34 then in the second wire 35.

Thus, the diode 51 may be connected to the second wire 35 and directed from the component 33 to the measurement means 50, as illustrated. Alternatively, the diode 51 could be connected to the first wire 34 but directed in reverse, from the measurement means 50 to the component 33.

Such an arrangement advantageously makes it possible to control the component 33 by sending a control signal thereto as previously described in reference to FIG. 1. Since this control signal only uses currents in the first direction S1 of the current flow, the diode 51 enables the passage of the control signal current. The assumption is made, which will be justified further on, that the presence of the measurement means 50 does not modify the transmission of the control signal to the component 33. Consequently, the device 31 according to the invention makes it possible to control the component 33 in the same way that the device 1 controls the component 3 according to the prior art.

It may be advantageously noted that the two wires 34, 35 are only used by the control unit 39 during the activity interval or intervals in which the control signal is actually present.

Outside of the activity intervals, i.e. during the free intervals, it is possible to reuse these two wires 34, 35. It is then possible to cause a current to flow in the member 32, during at least one of the free intervals, without interfering with the control of the component 33. In addition, any current flowing in the member 32 via the wires 34, 35, in a second direction S2, opposite to the first direction S1, does not flow in the component 33, because it is blocked by the diode 51. Consequently, such a current only flows in the measurement means 50 and thus makes it possible to perform a temperature measurement.

The device 31 according to the invention thus allows the component 33, 3 to be controlled following the example of, and according to the same modalities as the device 1 according to the prior art and in addition, by reusing the wires 34, 35 during one of the free intervals in which they are not used for the control of the component 33, makes it possible to perform a temperature measurement, without needing to add an additional wire.

In the case of an application in which it is wished to measure the temperature of a point of the member 32, the measurement means 50 is advantageously arranged as close as possible to said point, and therefore nearby, or better still in the member 32. The diode 51 may be arranged anywhere. However, an offset requires two connection wires. Consequently, because of its connection with the measurement means 50, and insofar as the objective is to eliminate wires, the diode 51 is advantageously also arranged nearby, or better still in the member 32.

It emerges from the foregoing that the invention, which advantageously makes it possible not to modify any wiring and connections, requires a minor modification to the member 32, consisting in integrating the measurement means 50 and the diode 51 nearby, or better still in the member 32.

According to one embodiment, the measurement means 50 is a thermistor T. A thermistor is a resistor particularly suitable for the measurement of a temperature. A thermistor is known for its accuracy and good resistance resolution according to temperature. Thus a resistance measurement provides an accurate measurement of temperature. A determination of resistance is, for example, obtained by applying Ohm's law: R=U/I, with R being the resistance, U the voltage and I the current. This application is achieved after measuring the current flowing through the thermistor T and determining the voltage at the terminals of the thermistor T.

A thermistor T, by its nature, has a variable resistance. However, in order to offer a good resolution of temperature measurement this resistance is generally high. According to one advantageous embodiment, the variation interval of the resistance of the thermistor T is chosen so that the resistance of the component 33 is negligible compared to the resistance of the thermistor T. Conventionally, negligible is understood to mean a ratio at least equal to 100.

The result is advantageously, as was previously assumed, that a current flowing in the first direction S1, mainly flows in the component 33 of lower resistance and that the control of the component 33 is not influenced by the presence of the thermistor T.

According to another feature, the thermistor T has a variable resistance, and is conventionally of the type with a negative temperature coefficient, NTC, or of the type with a positive temperature coefficient, PTC.

Such a measurement means 50, T well chosen in the context of the invention, makes it possible to perform a temperature measurement with an accuracy of the order of +/−1° C.

As it has been detailed in a preferred example of application, the member 32 is an injector INJ and the component 33 is a coil. Such a coil mobilizes a needle arranged in a nozzle of the injector INJ in order to control an opening section and thus a flow of an injected liquid. Knowing the temperature, which directly influences the viscosity of the liquid, makes it possible to correct the quantity of liquid injected.

Such an injector may be a fuel injector arranged in an intake pipe or directly in a cylinder of a combustion engine.

Such an injector may also be a reducing agent injector arranged in an exhaust pipe, upstream of a catalytic converter. Such an injector typically forms part of a Selective Catalytic Reduction (SCR) system.

More generally, the invention is applicable to any member 32 including a component 33 non-continuously controlled by two wires. Thus a solenoid valve, controlled intermittently by means of a control signal sent to the coil thereof may be a candidate.

As previously described the device 31 according to the invention further includes a control unit 39. This control unit 39 is connected to the two wires 34, 35, on the side opposite the component 33.

This control unit 39 includes a switching means 42, 43, 52, 53 capable of selectively switching between a control mode and a measurement mode.

The control mode is effective as soon as at least one of the switches 42, 43 is closed. In this mode, as previously described, the control signal is transmitted by means of the two wires 34, 35 for the attention of the component 33. This transmission uses a current flowing in the first direction S1. This transmission, by definition, is performed during an activity interval. The control mode at any point reproduces the only operating mode of the device 1 according to the prior art.

The device 31 according to the invention further allows operation in a measurement mode. This measurement mode is made possible by the presence of the additional switches 52, 53, forming a second half bridge composed of a first switch 52, LS2 and a second switch 53, HS2. The first half bridge 42, 43 and the second half bridge 52, 53 are advantageously controlled (simultaneous closure of both switches) in an exclusive manner. The second half bridge 52, 53 is reversed in relation to the first half bridge 42, 43.

Thus the first switch 52, LS2 makes it possible to selectively connect the ground 41 with the first wire 34. This connection is controlled, by the control unit 39, via the input point 54, a high signal level typically controlling a closure. The second switch 53, HS1 makes it possible to selectively connect a voltage source 40, V with the second wire 35. This connection is controlled, by the control unit 39, via the input point 55, a high signal level typically controlling a closure. If at least one of the switches 52, 53 is open no voltage is present. If both switches 52, 53 are simultaneously closed, a voltage V (or more exactly −V) is present between the two wires 34, 35 and thus at the terminals of the member 32 and therefore of the measurement means 50. A current is then established through the measurement means 50 and the two wires 34, 35. However, as a result of the reversal of the switches 52, 53 in relation to the switches 42, 43, this current is established in a second direction S2, opposite to the first direction S1. The two controls applied to the points 54, 55 advantageously simultaneously, together help to produce a current flowing in the measurement means 50.

This current, established through the measurement means 50, makes it possible to determine the resistance of the measurement means 50 and thus the temperature thereof, by knowing its resistance/temperature characteristic, by simultaneously measuring the voltage at the terminals of the measurement means 50 and the current passing therethrough.

The voltage applied to the terminals of the measurement means 50 is known, it is the voltage V of the power supply source 40.

The current may be measured at any place on the circuit and, for example, advantageously in the control unit 39. An assembly 56, similar to the assembly 16 previously described, is a possible means of measuring this current. Such an assembly 56 may be placed in series at any point on the circuit, and, for example, as represented, in series between the ground 41 and the switch 52. The assembly 56 includes a resistor and an operational amplifier. The resistor is connected in series between the first switch 52 and the ground 41. Each of the two terminals of the resistor is connected to an input of the operational amplifier the output of which is connected to a measurement point 57. A measurement at the point 57 is thus indicative of a voltage drop at the terminals of the resistor and thus, since the value of the resistor is known with precision, it is possible to estimate the current flowing in the resistor and therefore in the wires 34, 35 and the measurement means 50.

The control unit 39 may thus, by controlling the signals of the points 54, 55 so as to close the switches 52, 53, establish a current in the measurement means 50, advantageously during a free interval and in the second current direction S2, in order not to affect the component 33. This current is measured by performing a measurement at the point 57. The voltage V is known. An application of Ohm's law makes it possible to know the resistance of the measurement means 50 and thus the temperature.

The measuring device 31 makes it possible to measure the temperature of the measurement means 50. However, the temperature measurement is most often desired at a point of the member 32 where it is not possible or not desirable to place the measurement means 50.

Thus for an injector, the temperature is desired at the end of the nozzle. It is not possible to place a measurement means 50 exactly at this location.

Consequently, a thermal model may advantageously be used. Such a thermal model takes into account the position of the measurement means 50 in relation to the position of the point for which the temperature measurement is desired, e.g. the nozzle, and thus makes it possible to spatially, and where appropriate temporally, correct the temperature measurement.

The device 31 may further include a corrective module, applying said thermal model, in order to correct the temperature measurement performed at the measurement means 50, for estimating a temperature measurement at the desired point.

The invention further relates to the member 32 including the part of the measuring device 31 integrated in said member 32. This modified member 32 includes the member 2 according to the prior art modified by the addition of the measurement means 50 and of the diode 51.

The invention further includes an assembly including the member 32 and the rest of the measuring device 31, i.e. the member 32 and the control unit 39, optionally including the wires 34, 35.

The invention claimed is:

1. A temperature measuring device (31) for measuring a temperature of a component (33) of a member (32), where the component (33) is controlled by means of a control signal for actuating the component, the control signal active at most during at least one limited activity interval and transmitted to the component (33) via two wires (34, 35), the temperature measuring device (31) comprising:
   a temperature measurement means (50) connected to the two wires (34, 35), in parallel with the component (33); and
   a diode (51), connected between a terminal of the component (33) and a terminal of the measurement means (50), the diode (51) connected in series with the component (33) and in parallel with the temperature measurement means (50), the diode (51) configured to allow passage of current through the component (33) only in a first direction (S1),
   the temperature measurement means (50) configured to perform temperature measurement of the component by means of a measuring current through the temperature measurement means (50) via the two wires, where said measuring current flows at instants of time outside of the activity interval of the control signal and in a second direction (S2) opposite the first direction (S1).

2. The temperature measuring device (31) as claimed in claim 1, further comprising:
   a control unit (39), connected to the two wires (34, 35), on a side opposite the component (33), the control unit (39) comprised of
   a switching means (42, 43, 52, 53) that selectively switches between
      a control mode in which the control signal is transmitted, during the activity interval, by means of the two wires (34, 35) to control the component (33) by means of the control current flowing in the first direction (S1), and
      a measurement mode in which the measuring current flows, outside of the activity interval, in the second direction (S2) through the two wires (34, 35) and the measurement means (50).

3. The temperature measuring device (31) as claimed in claim 1, further comprising:
   a corrective module configured to generate a corrected temperature measurement from said temperature measurement by applying a thermal model that takes into account a spatial position of the measurement means in relation to a position on the component at which a temperature is to be determined by the temperature measuring device.

4. A member (32) including the temperature measuring device (31) as claimed in claim 1.

5. The temperature measuring device (31) as claimed in claim 1, wherein the measurement means (50) and the diode (51) are arranged inside the member (32).

6. The temperature measuring device (31) as claimed in claim 5,
wherein the measurement means (50) is a thermistor (T), and
wherein a resistance of the component (33) is negligible compared to a resistance of the thermistor (T).

7. The temperature measuring device (31) as claimed in claim 5, further comprising:
a control unit (39), connected to the two wires (34, 35), on a side opposite the component (33), the control unit (39) comprised of
a switching means (42, 43, 52, 53) that selectively switches between
a control mode in which the control signal is transmitted, during the activity interval, by means of the two wires (34, 35) to control the component (33) by means of the control current flowing in the first direction (S1), and
a measurement mode in which the measuring current flows, outside of the activity interval, in the second direction (S2) through the two wires (34, 35) and the measurement means (50).

8. A member (32) including the temperature measuring device (31) as claimed in claim 5.

9. The temperature measuring device (31) as claimed in claim 1,
wherein the measurement means (50) is a thermistor (T), and
wherein a resistance of the component (33) is negligible compared to a resistance of the thermistor (T).

10. The temperature measuring device (31) as claimed in claim 9, further comprising:
a control unit (39), connected to the two wires (34, 35), on a side opposite the component (33), the control unit (39) comprised of
a switching means (42, 43, 52, 53) that selectively switches between
a control mode in which the control signal is transmitted, during the activity interval, by means of the two wires (34, 35) to control the component (33) by means of the control current flowing in the first direction (S1), and
a measurement mode in which the measuring current flows, outside of the activity interval, in the second direction (S2) through the two wires (34, 35) and the measurement means (50).

11. A member (32) including the temperature measuring device (31) as claimed in claim 9.

12. The temperature measuring device (31) as claimed in claim 9, wherein the thermistor (T) has a variable resistance.

13. The temperature measuring device (31) as claimed in claim 12, wherein the thermistor is of the type with a negative temperature coefficient.

14. The temperature measuring device (31) as claimed in claim 12, wherein the thermistor is of the type with a positive temperature coefficient.

15. The temperature measuring device (31) as claimed in claim 12, further comprising:
a control unit (39), connected to the two wires (34, 35), on a side opposite the component (33), the control unit (39) comprised of
a switching means (42, 43, 52, 53) that selectively switches between
a control mode in which the control signal is transmitted, during the activity interval, by means of the two wires (34, 35) to control the component (33) by means of the control current flowing in the first direction (S1), and
a measurement mode in which the measuring current flows, outside of the activity interval, in the second direction (S2) through the two wires (34, 35) and the measurement means (50).

16. A member (32) including the temperature measuring device (31) as claimed in claim 12.

* * * * *